United States Patent [19]
Nadherny

[11] Patent Number: 5,584,623
[45] Date of Patent: Dec. 17, 1996

[54] CORNER EDGE PROTECTOR FOR LADING

[75] Inventor: Rudolph E. Nadherny, Naperville, Ill.

[73] Assignee: Ireco, Inc., Chicago, Ill.

[21] Appl. No.: 360,232

[22] Filed: Dec. 20, 1994

[51] Int. Cl.⁶ .................................................. B65D 85/48
[52] U.S. Cl. ............................ 410/99; 410/155; 410/156
[58] Field of Search .................................. 410/96, 97, 98, 410/99, 155, 156

[56] References Cited

U.S. PATENT DOCUMENTS

| | | |
|---|---|---|
| 2,772,064 | 11/1956 | Cole ............................................ 410/99 |
| 3,073,439 | 1/1963 | Symmonds, Jr. . |
| 3,152,693 | 10/1964 | Anderson . |
| 3,199,709 | 8/1965 | Morrison et al. . |
| 3,908,850 | 9/1975 | Jureit et al. . |
| 3,960,091 | 6/1976 | Ehlert . |
| 4,011,632 | 3/1977 | MacDonald . |
| 4,765,479 | 8/1988 | Roberts . |
| 4,938,357 | 7/1990 | Schmidt . |
| 5,056,664 | 10/1991 | Demers . |
| 5,114,010 | 5/1992 | Smith ........................................ 410/99 |
| 5,311,996 | 5/1994 | Duffy et al. . |
| 5,340,250 | 8/1994 | Meriwether et al. ....................... 410/99 |

FOREIGN PATENT DOCUMENTS 268592  4/1966  Australia .

Primary Examiner—Karen B. Merritt
Assistant Examiner—Gregory A. Morse
Attorney, Agent, or Firm—Lockwood, Alex, Fitzgibbon & Cummings

[57] ABSTRACT

Corner edge protectors for lading tied down by a cable running over a corner edge of the lading. The protector may be formed of rigid or lightweight, distortable, shape-resuming semi-rigid durable plastic such as polyurethane. The protector is L-shaped and relatively wide so as to provide a substantial lading-engaging surface area. One of the legs of the protector, usually the vertical leg when installed, has an integrally formed cable-retaining hook-shaped tab formation which is yieldable to allow entry and exit of a tie down cable. The other leg, usually the horizontal leg when installed, may have a cushion formation into which a taut cable sinks.

8 Claims, 2 Drawing Sheets

CORNER EDGE PROTECTOR FOR LADING

BACKGROUND AND DESCRIPTION OF THE INVENTION

This invention relates, generally, to innovations and improvements in corner edge protectors for lading when tie down cables are drawn tight over the corner edges of the lading to secure the lading, such as lumber, in position during transit on a cargo vehicle such as the flat bed of a bulkhead flat car having a center beam and a line of upstanding center posts to which the free ends of the tie down cables can be secured while their opposite ends are winched tight. More particularly, the invention relates to such lading corner edge protectors which may be readily installed on, and manually removed from tie down cables but which due to the stiffness of such cables will not otherwise separate from the cables after installation thereon. If corner edge protectors are not used, the corner edges of lading such as lumber, will usually be mutilated during the installation and tightening of the tie down cables and additionally during transit, Heretofore, lading corner edge protectors formed of steel or a rigid plastic material have been found deficient or objectionable in one or more respects which will be mentioned below in setting forth the advantages and improvements provided by the corner edge protectors of the present invention, The corner edge protectors of the present invention are generally L-shaped and are relatively wide and thin and formed of a durable plastic, preferably, semi-rigid polyurethane. The leg of the corner protector of the present invention which engages the vertical edge of a lading corner is provided with a cable-locking or retaining hook-shaped tab which may be bendable. Once a corner protector of the present invention has been attached to a tie down cable, it will not come off from the cable unless deliberately removed. The legs of the corner protectors of the invention which engage the top or horizontal side of a lading corner edge are preferably provided with cushion formations which are depressed when a tie down cable is tightened over the corner edge.

Lading corner protectors of the present invention formed of a durable semi-rigid or rigid plastic will withstand the elements including rain, snow and ice and a wide range of temperatures from well below to well above freezing as well as sunlight and exposure to grease, oil and various forms of dirt in conditions encountered in use. The cushion formations on the lading corner protectors which are engaged by tightened tie down cables do not take a permanent set even though they are subjected to deformation over long periods of time.

While the corner protectors are generally L-shaped, the ones formed of semi-rigid plastic are sufficiently deformable and tough so that even if they happen to be run over by the wheel of a vehicle such as a forklift and deformed to the point that they are essentially flattened, they will regain their L-shaped configuration once the load is removed.

In view of the foregoing considerations, it will be seen that the object of the invention, generally stated, is the provision of inexpensive lading corner edge protectors which are formed of durable plastic and are characterized by having integrally formed cable-locking or retaining hook-shaped tabs by which they can be releasably secured to a lading tie down cable without having to disassemble the cable assembly. Preferably, they have cable cushions which are engaged and depressed when the cable ties are drawn taut thereon, and which are resistant to a wide range of environmental conditions and materials to which they may be exposed and subjected during prolonged use.

For a more complete understanding of the nature and scope of the invention, reference may now be had to the following detailed description of presently preferred embodiments thereof taken in conjunction with the accompanying drawings in which:

BRIEF DESCRIPTION OF THE DRAWINGS

Referring to FIG. 1, a center beam railway car is indicated therein generally at 5. The car 5 is shown loaded with lading in the form of stacked lumber 6 tied down on both sides by a plurality of tie down cables 7—7. In accordance with known practice, the upper or releasable ends of the tie down cables 7 are shown attached to center posts 8—8 while at their lower ends the cables 7 are wound on winches 4—4 mounted in known manner on the sides of the car 5. When not in use with lading the tie down cables 7 remain attached to the center posts 8 and are tightened sufficiently so that they will remain in place.

Referring to FIG. 2, a lading corner edge protector is indicated generally at 10 which embodies the present invention. The protector 10 is generally L-shaped and injection molded or otherwise suitably formed of a durable plastic such as polyurethane. The vertical leg 11 has a deflectable cable retaining tab indicated generally at 12 integrally formed with and hinged to the leg 11. The tab 12 is generally hook or U-shaped in cross-section as shown in FIG. 4 with the vertical edge 3 of its distal end 13 extending into the opening or window 9 in the leg 11 and spaced opposite an integrally formed abutment indicated generally at 14. If a cable presses against the inner side of the distal end of the tab 12, the sidewise force will produce a sidewise movement of the distal end until it engages the side of the opening 9 or the abutment 14, or both.

Figure 1:
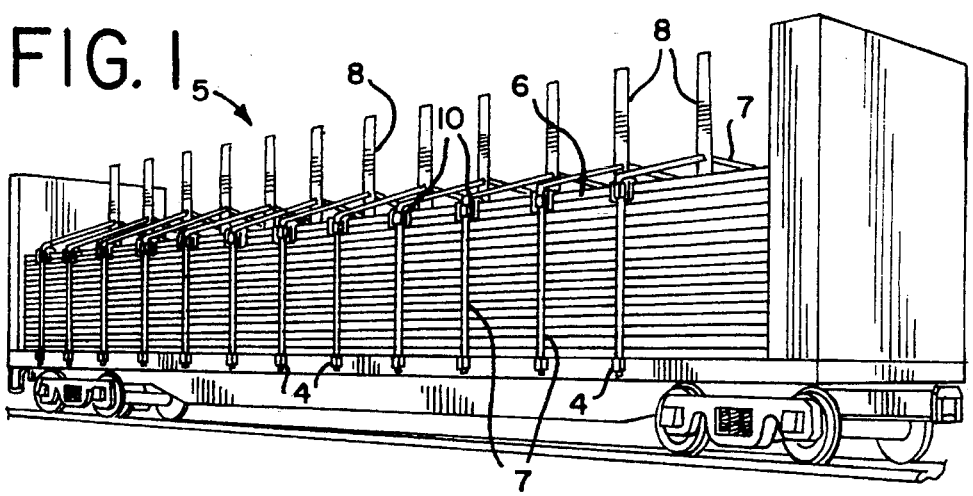
FIG. 1 is a perspective view of a center beam railway flat car loaded with lumber and showing a primary use for lading corner edge protectors of the present invention.
Figure 2:
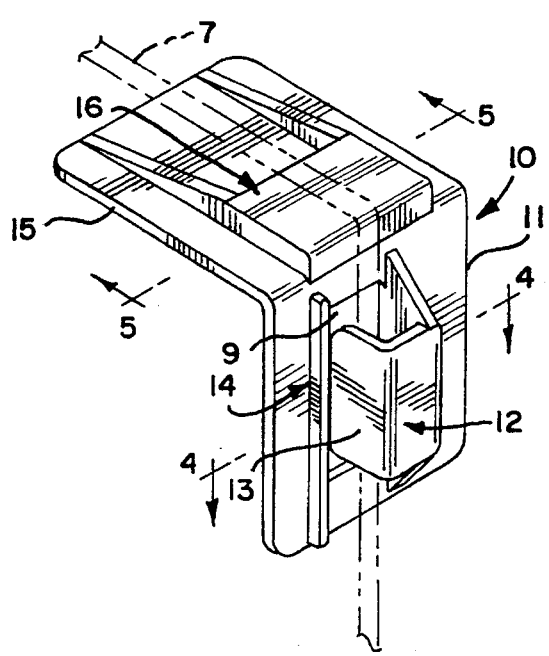
FIG. 2 is a perspective view of a lading corner edge protector embodying the present invention with a tie down cable shown in the tie down position and condition it normally occupies when the cable is drawn taut.
Figure 5:
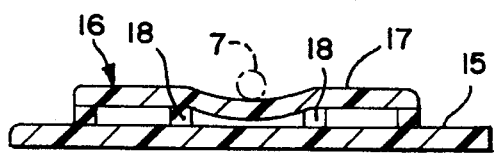
FIG. 5 is a sectional view on enlarged scale taken on line 5—5 of FIG. 2

On its upper horizontal leg 15, the lading corner edge protector 10 has an integrally formed cushion formation indicated generally at 16. The flexible top or outer wall 17 of the cushion 16 is spaced above the leg 15 as shown in FIG. 5 and includes two spaced internal support ribs 18—18 which are integrally formed with the leg 15 and top wall 17 and positioned on opposite sides of the center line of the cushion 16. When a tie down cable 7 is drawn down taut over the protector 10 as shown in FIG. 1, it indents or seats into the cushion 16 as illustrated in FIG. 5. The tendency of the top wall 17 of the cushion 16 to resume its non-indented or non-grooved condition assists in maintaining the tie down cable 7 in its taut condition. Even if the vertical edge 3 of the distal end 13 of the tab is integrally joined to the abutment 14 so that the protector 10 can only be applied and removed over a free end of the cable 7, the cushion 16 can still function as intended and described.

Figure 3:
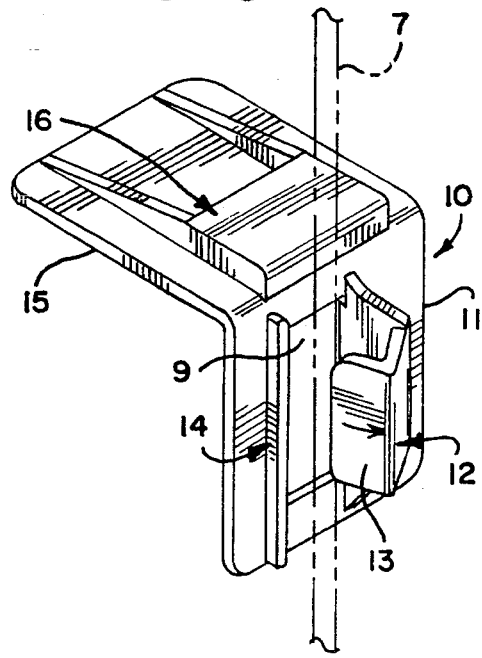
FIG. 3 is a perspective view of the lading corner edge protector of FIG. 2 with its locking tab deflected outwardly so as to permit either installation on or removal from a tie down cable.
Figure 4:
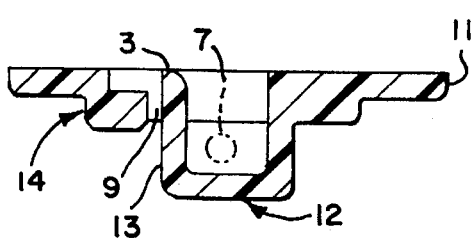
FIG. 4 is a sectional view on enlarged scale taken on line 4—4 of FIG. 2.
Figure 6:
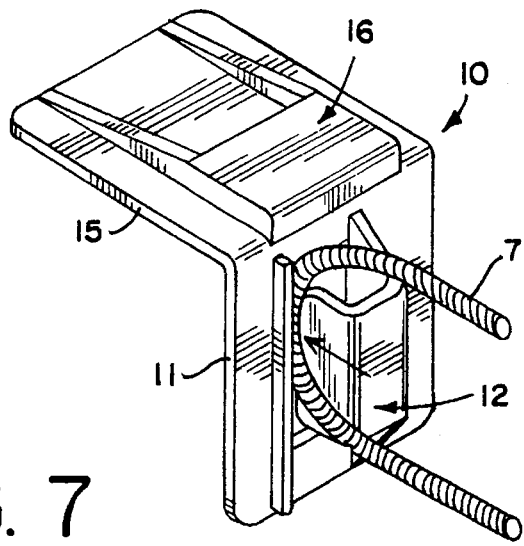
FIG. 6 is a perspective view of the lading corner edge protector of FIG. 2 illustrating how a tie down cable can be inserted by deflecting the locking tab inwardly.

In use, a lading corner edge protector 10 is applied to a tie down cable by either manually deflecting or opening the retainer tab 12 outwardly as illustrated in FIG. 3 so as to permit insertion of the cable or the cable may be doubled over on itself and forced into the retainer flange or tab 12 as illustrated in FIG. 6. Once in place on a lading tie down cable, the protector 10 will normally remain on the cable due to stiffness until manually removed, although it may slide to various positions on a cable 7 depending on how the tie down cable is handled. However, if for any reason it is desired to remove a lading corner edge protector 10 from a tie down cable, the retainer tab 12 can be deflected to its open position illustrated in FIG. 3 and the protector removed from the cable. A typical tie down cable is formed of woven wire and has a diameter of from one-quarter to three-quarters of an inch. One such tie down cable having a diameter of three-quarters of an inch has a stiffness such that a force of approximately four pounds is required to bend an eighteen inch long piece of the cable into a hook or U-shape as shown in FIG. 6. Due to its stiffness, the cable rests on the upper and lower sides of the opening 9 so as to bridge the opening.

In some instances after a lading of lumber or the like has been loaded onto the bed of a rail car a workman standing on top of the lading may attach the corner protectors 10 to the cables 7 and then place them on the corner edges of the lading prior to winching the cable ties to their tight or taut condition. In such cases, it is not unusual for a workman standing on the ground to toss the protectors 10 up to a workman on the top of the lading for installation. In the event the workman standing on the lading fails to catch one of the protectors there is danger of it falling back down and striking the workman on the ground. Thus, injuries can occur when the sharp edges of heavy corner protectors of the prior art formed of iron or steel strike the workman on the ground. Because of the light weight of the plastic protectors 10 and absence of sharp corners thereon such injuries do not present a significant risk.

Figure 7:
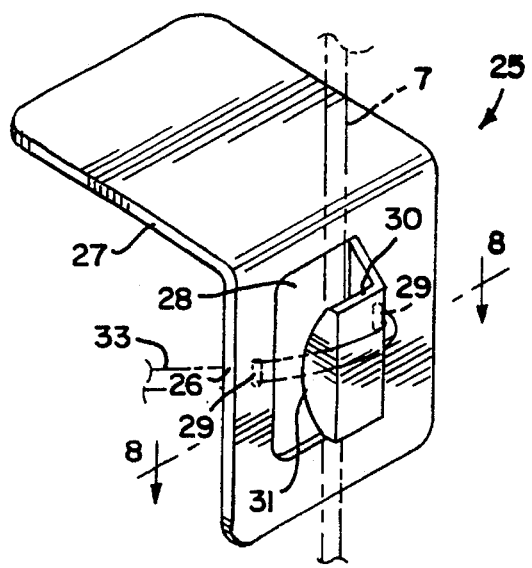
FIG. 7 is a perspective view of a corner edge protector forming another embodiment of the invention.
Figure 8:
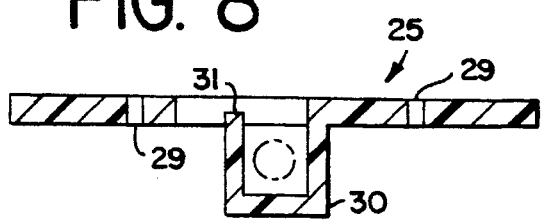
FIG. 8 is a sectional view on enlarged scale on line 8—8 of FIG. 7.

A second embodiment of the invention in the form of a corner edge lading protector is indicated generally at 25 in FIGS. 7 and 8. The protector 25 has a 90° L-shape and is relatively wide similar to the protector 10 shown in FIGS. 2–6. The protector 25 has a vertical leg 26 and a horizontal leg 27. The leg 26 is formed with an opening 28 to which one vertical edge of which a cable-retaining hook-shaped tab 30 is attached. The distal end of the hook 30 is formed with an arcuate edge 31 which extends into the opening 28 as shown in FIG. 8. A lading tie down cable 7 is attached to the corner protector 25 by bending the cable into a U-shape as shown in FIG. 6 and inserting the bight into the opening and into the hook 30. After insertion the bending force on the cable is released and the cable assumes a straightened condition due to its stiffness. In order to prevent inadvertent disengagement of the cable 32 from the protector 25, a pair of holes 29—29 are provided in the leg 26 for receiving a plastic or wire tie 33 which embraces both the cable 7 and hook 30 as illustrated in broken line. The corner protector 25 will remain attached to the cable 32 until the tie 33 is untied and the cable 7 is flexed sufficiently so that it can be moved past the distal end 31 and removed from the hook 30.

The corner edge lading protector 25 may be injection molded from a suitable plastic such as polyurethane, polystyrene, polyethylene or other suitable plastic material that will be durable and withstand the elements and conditions under which lading corner protectors are normally used. The plastic used may be rigid or semi-rigid, as desired.

Figure 9:
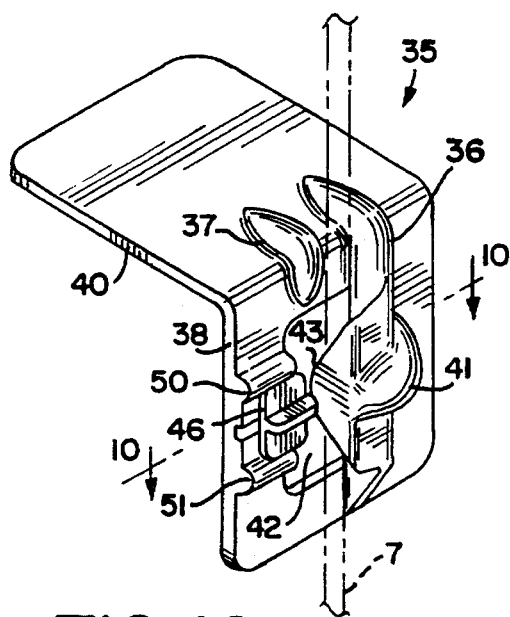
FIG. 9 is a perspective view of a corner edge protector forming a third embodiment of the invention.
Figure 10:
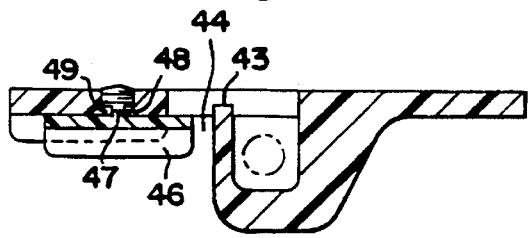
FIG. 10 is a sectional view on enlarged scale taken on line 10—10 of FIG. 9.

In FIGS. 9 and 10 a corner edge lading protector is indicated generally at 35 forming a third embodiment of the invention. The protector 35 may be formed in an L-shape similar to protectors 10 and 25 and from similar plastic materials. The protector 35 is formed with rigidifying embossments 36 and 37 which extend over the corner between the vertical leg 38 and the horizontal leg 40. The embossment 36 includes an integrally formed cable-retaining hook 41 the proximal end of which is integrally attached to a vertical edge of the opening 42. The distal end 43 of the hook 41 extends into the opening 42 as shown in FIG. 10 leaving a cable insertion and removal space or gap 44 between the distal end and the adjacent vertical edge of the opening 42. In order to provide additional positive security against a tie down cable 7 becoming unattached from the protector 35, it is provided with a cable-retaining space-closing button or key 46. The key 46 is provided with stem 47 having a plurality of axially spaced flexible fins which has a friction fit within an opening 48 in the leg 38 such as to allow the key 46 to be forcibly inserted and retained in place as shown until forcibly retracted or removed. Preferably, the stem-receiving hole 48 is provided with a circumferential stem-retaining shoulder 49.

In order to further secure the key 46 against accidental removal, the leg 38 is provided with upper and lower key retaining formations or ridges 50 and 51.

The cable 7 may be inserted into the protector 35 by bending it into a U-shape and then inserting the bight into the opening 42 and under the distal end of the hook 41. The key 46 is removed while the cable is inserted into the opening 42 and then replaced so that the inner end of the key prevents the cable from being removed.

What is claimed is:

1. A corner edge protector for protecting a corner edge of lading tied down by cables running transversely over a lading corner edge, comprising, a relatively wide L-shaped corner-fitting member with one of its two legs having a window opening therein and an integrally formed cable retaining hook-shaped tab thereon extending at least substantially completely across said opening and cooperable with said opening and said one leg whereby once an intermediate portion of a stiff cable has been inserted within said tab said cable will remain in place therein bridging said opening due to the stiffness of the cable, and said protector will remain attached to said cable until manually removed therefrom.

2. A lading corner edge protector as called for in claim 1, wherein said window opening has opposing side edges extending parallel to a cable passing over the protector and the proximal end of said cable retaining hook-shaped tab is integrally hinged to a first of said side edges and the distal end of said tab projects into said opening adjacent to the second of said side edges, and said tab is semi-rigid whereby upon applying a sidewise force on the inner side of said distal end by means of a cable in said tab said distal end flexes outwardly and its sidewise movement is limited by engagement with said second of said side edges thereby retaining the cable within said tab.

3. A lading corner edge protector as called for in claim 2, wherein said cable retaining hook-shaped tab may be opened sufficiently to permit both insertion and removal of a cable from within said tab and wherein the bight of a bent length of cable may be forced between said distal end and said second of said side edges into said window opening so as to insert the cable past and under the distal end and into said tab.

4. A lading corner edge protector for protecting a corner edge of lading tied down by cables running transversely over the corner edge, comprising, a relatively wide and generally L-shaped corner-fitting member formed of distortable, shape-resuming semi-rigid durable plastic with one of its two legs having an integrally formed cable-retaining formation thereon and with its other leg having an integrally formed cushion formation thereon for a cable running thereover, said cushion having a flexible outer wall undentible by a taut cable spaced from said other leg.

5. The corner edge protector of claim 4, wherein said cushion formation has internal support ribs extending in spaced relationship on opposite sides of its cable-engaging area.

6. A lading corner edge protector for protecting a corner edge of lading tied down by cables running transversely over the corner edge, comprising, a relatively wide and generally L-shaped corner-fitting member formed of distortable, shape-resuming semi-rigid durable plastic with one of its two legs having an integrally formed cable-retaining tab which tab is generally hook-shaped and integrally hinged at its proximal end to said one leg so that its distal end is flexible both inwardly and outwardly with respect to the body of said tab so as to permit insertion and retainment of a cable within the interior of said tab.

7. A lading corner edge protector for protecting a corner edge of lading tied down by cables running transversely over said corner edge, comprising, a relatively wide and generally L-shaped corner fitting member with one of its two legs having a window opening therein with opposed side edges extending parallel to a cable passing over the protector and an integrally formed cable retaining hook-shaped tab thereon with its proximal end attached to one of said side edges and its distal end extending into said opening adjacent the other one of said side edges with a space between said distal end and said other one of said side edges sufficient to permit insertion and removal of a cable therebetween, and a tie extending through holes in said one leg on opposite sides of said window opening therein and embracing both a cable within said tab and the tab itself so as to retain said cable within said tab.

8. A lading corner edge protector for protecting a corner edge of lading tied down by cables running transversely over said corner edge, comprising, a relatively wide and generally L-shaped corner fitting member with one of its two legs having a window opening therein with opposed side edges extending parallel to a cable passing over the protector and an integrally formed cable retaining hook-shaped tab thereon with its proximal end attached to one of said side edges and its distal end extending into said opening adjacent the other one of said side edges with a space between said distal end and said other one of said side edges sufficient to permit insertion and removal of a cable therebetween, and a space-closing button rotatably mounted on the exterior of said one leg adjacent said other one of said side edges, said button being rotatable into one position in which it closes said cable insertion and removal space and into another position in which it opens said space.

* * * * *